United States Patent
Edpalm

(10) Patent No.: US 9,948,855 B2
(45) Date of Patent: Apr. 17, 2018

(54) METHOD AND DEVICE FOR CONTROLLING A CAMERA CAPABLE OF PAN AND TILT CONTROL

(71) Applicant: Axis AB, Lund (SE)

(72) Inventor: Viktor Edpalm, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/445,415

(22) Filed: Feb. 28, 2017

(65) Prior Publication Data

US 2017/0257560 A1 Sep. 7, 2017

(30) Foreign Application Priority Data

Mar. 1, 2016 (EP) ................................ 16158024

(51) Int. Cl.
| | | |
|---|---|---|
| *H04N 5/232* | (2006.01) | |
| *H04N 7/18* | (2006.01) | |
| *H04N 19/513* | (2014.01) | |
| *G06F 3/0338* | (2013.01) | |

(52) U.S. Cl.
CPC ....... *H04N 5/23216* (2013.01); *G06F 3/0338* (2013.01); *H04N 5/23296* (2013.01); *H04N 7/181* (2013.01); *H04N 19/513* (2014.11)

(58) Field of Classification Search
CPC ............... H04N 5/23216; H04N 5/144; H04N 5/23296; H04N 7/181; G06F 3/0338; G08B 13/19689; G08B 13/1963

USPC ............................................ 348/211.7, 211.8
See application file for complete search history.

(56) References Cited

U.S. PATENT DOCUMENTS

| | | | |
|---|---|---|---|
| 8,125,542 B2 | 2/2012 | Ishikawa | |
| 8,135,068 B1 | 3/2012 | Alvarez et al. | |
| 2007/0098073 A1* | 5/2007 | Maeda | H04N 5/232 375/240.16 |
| 2008/0030585 A1 | 2/2008 | Grigorian et al. | |
| 2010/0045817 A1 | 2/2010 | Saijo | |
| 2010/0157057 A1* | 6/2010 | Lim | H04N 7/18 348/148 |
| 2010/0284471 A1 | 11/2010 | Tsai et al. | |
| 2014/0169469 A1 | 6/2014 | Bernal et al. | |
| 2014/0267808 A1 | 9/2014 | Kuwata | |
| 2015/0326777 A1 | 11/2015 | Adachi | |
| 2016/0057445 A1* | 2/2016 | Tsubaki | H04N 19/521 382/236 |

FOREIGN PATENT DOCUMENTS

KR    10-2013-0105047 A    9/2013

OTHER PUBLICATIONS

EP 16 15 8024.6 European Search Report (dated May 20, 2016).

* cited by examiner

*Primary Examiner* — Albert Cutler
(74) *Attorney, Agent, or Firm* — Volpe and Koenig, P.C.

(57) ABSTRACT

The present invention relates generally a method and device for controlling a camera capable of pan and tilt control, and more specifically a method and device for controlling adjustments of the field of view of such camera.

9 Claims, 3 Drawing Sheets

METHOD AND DEVICE FOR CONTROLLING A CAMERA CAPABLE OF PAN AND TILT CONTROL

FIELD OF INVENTION

The present invention relates generally a method and device for controlling a camera capable of pan and tilt control, and more specifically a method and device for controlling adjustments of the field of view of such camera.

BACKGROUND

For many video camera applications, e.g. monitoring applications, it is advantageous to use a camera which can pan, tilt (and optionally zoom and/or rotate) to cover a large area. Such camera is known under the name PT (pan-tilt) camera, PTZ (pan-tilt-zoom) camera etc. The PT functionality may also be provided by the camera being mounted on a so called PT head, which is a motorized mounting base which can pan and tilt a camera mounted thereon. During e.g. a pan/tilt motion of the camera, the bit rate of a video stream captured by the camera can reach high levels. This is due to the fact that the adjustment within the video stream, i.e. between two consecutive image frames within the video stream, makes P-block encoding difficult to achieve. Consequently, most or all pixel blocks within an image frame are encoded using costly I-blocks during such adjustment, leading to an increased bit rate.

Within video processing there is a continuing effort put into reducing the bit rate while maintaining a perceived quality of the video stream. A solution to the above problem is to adapt a motion vector search range of the encoder encoding the video stream according to the speed of the pan/tilt adjustment. Since searching for matching blocks of pixels between two images usually requires a large amount of arithmetic computation and an increase motion vector search range lead to that more comparisons is made, a problem with this solution is that the computational complexity of the encoding process will increase, thus requiring more processor power and/or increase processing time for completing the encoding process.

There is thus a need for improvements within this context.

SUMMARY

In view of the above, an objective of the invention is to solve or at least reduce one or several of the drawbacks discussed above. Generally, the above objective is achieved by the attached independent patent claims.

According to a first aspect, the present invention is realized by a method for controlling a camera capable of pan and tilt, PT, control, the camera being connected to an encoder arranged to encode a video stream captured by the camera, the encoder having a motion vector search range, the method comprising the steps of:

retrieving a first field of view, FOV, setting of a current image frame in the video stream, receiving a user input pertaining to a desired adjustment of the FOV from the first FOV setting to a second FOV setting in a subsequent image frame in the video stream, defining a period of time between the current image frame and the subsequent image frame using a frame per second, FPS, setting of the camera, and calculating a speed and a direction of the desired adjustment of the FOV using the period of time, determining a first threshold speed by translating the motion vector search range of the encoder to a maximum adjustment of the FOV of the camera during the period of time and calculating a speed of the maximum adjustment of the FOV, determining a second threshold speed by multiplying the first threshold speed with a value higher than 1, and comparing the speed of the desired adjustment of the FOV with the first threshold speed and the second threshold speed.

If the speed of the desired adjustment of the FOV is higher than the second threshold speed or lower than the first threshold speed, the FOV of the camera is adjusted from the first FOV setting to the second FOV setting during the period of time. In other words, the FOV of the camera is adjusted according to the user input.

However, if the speed of the desired adjustment of the FOV is between the first threshold speed and second threshold speed, the FOV of the camera is adjusted, during the period of time, based on the direction of the desired adjustment of the FOV and the first threshold speed.

This means that in case the user wants to adjust the FOV of the camera with a magnitude such that the encoder still will be able to find matching blocks between two consecutive images in the video stream using the motion vector search range of the encoder, the adjustment of the FOV (via a pan/tilt movement of the camera) is carried out as requested by the user. For example, if the motion vector search range of the encoder is 15 pixels, and the user wants to adjust the FOV with a magnitude corresponding to less or equal to 15 pixels difference between two consecutive images in the video stream, the adjustment is carried out as desired by the user and most blocks of pixels within the video stream will be encoded using P-blocks.

Also, if the user wants to adjust the FOV of the camera with a magnitude which to corresponds to more than a threshold times the motion vector search range, e.g. a 50 pixels difference between two consecutive images in the video stream in the case of a 15 pixels motion vector search range, the adjustment is carried out as desired by the user and most blocks of pixels within the video stream will be encoded using I-blocks.

However, if the user want to adjust the FOV of the camera with a magnitude that corresponds to a more than the motion vector search range of pixels difference between two consecutive image frames, but still below the second threshold difference, the speed of the adjustment of the FOV is decreased compared to what was desired from the user, such that most blocks of pixels within the video stream will be encoded using P-blocks.

One advantage of the present embodiment is that for a certain range of adjustments of the FOV, the speed of the adjustment will be capped to meet the motion vector search range of the encoder. Consequently, the encoder will be able to encode most of the blocks of pixels using P-blocks, and the user may not notice the deviation of the speed of the adjustment of the FOV of the camera compared to the desired speed. For example, the user input may pertain to an adjustment of the FOV with 96 degrees in a horizontal direction over the next 24 image frames. This means that for each frame, the FOV need to be adjusted with 4 degrees. When determining the speed of the maximum adjustment of the FOV (based on the motion vector search range of the encoder), this is in this example calculated to correspond to an adjustment of 3 degrees per image frame. The adjustment of the FOV may thus be changed such that the 80 degrees adjustment of the FOV is performed during the next 32 frames instead, which will lead to a lower bit rate since the encoder can encode most of the image frames using P-blocks, and the user may not perceive the eight extra frames that the adjustment took as disturbing.

By the term "motion vector search range" should, in the context of present specification, be understood the image search range for motion compensation in the encoder. In video compression, a motion vector is the key element in the motion estimation process. It is used to represent a block of pixels in an image frame based on the position of this block of pixels (or a similar block of pixels) in another image frame (reference image), e.g. the immediately preceding image frame in the video stream. As described above, the motion vector search range determines the size of the area in the reference image in which the search for a similar block of pixels is conducted.

By the term "FOV setting" should, in the context of present specification, be understood the extent of the scene around the camera that is captured by an image sensor of the camera and transmitted to the encoder at any given moment. The field of view can also be called angle of view (AOV). It is important to distinguish the term FOV from the extent of the scene around the camera that the image sensor of the camera is capturing. Normally, the image data captured by the image sensor is equal to the FOV, but in some cases, so called digital FOV can be employed. This means that from the data captured by the image sensor, only a subpart is transmitted to the encoder and subsequently forming the encoded video stream. In this specification, the term FOV of the camera should be understood to encompass both the above described implementations of FOV. Throughout this specification, including in the claims, "FOV" and "FOV settings" are used synonymously to denote the extent of the scene around the camera that is captured by an image sensor of the camera and transmitted to the encoder at any given moment.

When determining the first threshold speed, the motion vector search range of the encoder, e.g. 15 pixels, is translated to instead describe an adjustment of the FOV. In other words, it is calculated what the maximum adjustment of the FOV is that still would allow the encoder to find matching blocks of pixels between two image frames in the area defined by the motion vector search range. Of course, this is a theoretical calculation which is based on the assumption that contents of the scene captured by the camera have not moved between the two images. Based on this theoretical calculation, a speed of the maximum adjustment of the FOV can be calculated and used as the first threshold speed. The translation from a number of pixels (motion vector search range) to an adjustment of the FOV involves the image resolution of the image frames captured by the camera as well as the angular extent (in some cases, the angle of view of the lens of the camera) of a given scene that is captured by the camera and encoded by the encoder.

According to some embodiments, the camera is further capable of zoom, Z, control.

According to some embodiments, the camera is further capable of rotation, R, control.

According to some embodiments, the encoder is arranged to encode the video stream with a FPS setting different than the FPS setting of the camera. In this case, a ratio between the FPS setting of the encoder and the FPS setting of the camera is advantageously calculated and considered when determining the first threshold speed. For example, if the encoder encodes only one image frame per second while the camera captures 20 image frames per second, the maximum adjustment of the FOV from one image frame to the next for the camera may only correspond to $\frac{1}{20}$ of the motion vector search range as described above. Alternatively, the maximum adjustment of the FOV from image frame n to image frame n+20 may only correspond to the motion vector search range as described above.

According to some embodiments, the second threshold speed is determined by multiplying the first threshold speed with 2. This may be considered as a good balance between the users' perceived deviation between the desired speed and the actual speed of the adjustment of the FOV and the decrease of bit rate of the encoded video stream outputted from the encoder.

In a second aspect, the present invention provides a computer program product comprising a computer-readable storage medium with instructions adapted to carry out the method of the first aspect when executed by a device having processing capability.

In a third aspect, the present invention provides a controlling device adapted for controlling a camera capable of pan and tilt, PT, control, the camera being connected to an encoder arranged to encode a video stream captured by the camera, the encoder having a motion vector search range, the controlling device comprising a processor arranged for:

retrieving, from the camera, a first field of view, FOV, setting of a current image frame in the video stream, receiving a user input pertaining to a desired adjustment of the FOV from the first FOV setting to a second FOV setting in a subsequent image frame in the video stream, defining a period of time between the current image frame and the subsequent image frame using a frame per second, FPS, setting of the camera, and calculating a speed and a direction of the desired adjustment of the FOV using the period of time, determining a first threshold speed by translating the motion vector search range of the encoder to a maximum adjustment of the FOV of the camera during the period of time and calculating a speed of the maximum adjustment of the FOV, determining a second threshold speed by multiplying the first threshold speed with a value higher than 1, comparing the speed of the desired adjustment of the FOV with the first threshold speed and the second threshold speed, upon determining that the speed of the desired adjustment of the FOV is higher than the second threshold speed or lower than the first threshold speed, adjusting the FOV of the camera from the first FOV setting to the second FOV setting during the period of time, upon determining that the speed of the desired adjustment of the FOV is between the first threshold speed and second threshold speed, adjusting the FOV of the camera during the period of time based on the direction of the desired adjustment of the FOV and the first threshold speed.

In a fourth aspect, the present invention provides a camera capable of pan and tilt, PT, control, the camera being connected to an encoder arranged to encode a video stream captured by the camera, the camera comprising a controlling device according to the third aspect.

According to some embodiments, the camera is connected to a joystick for providing the user input pertaining to the desired adjustment of the FOV.

The second, third and fourth aspect may generally have the same features and advantages as the first aspect.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF THE PREFERRED EMBODIMENTS

Figure 1:
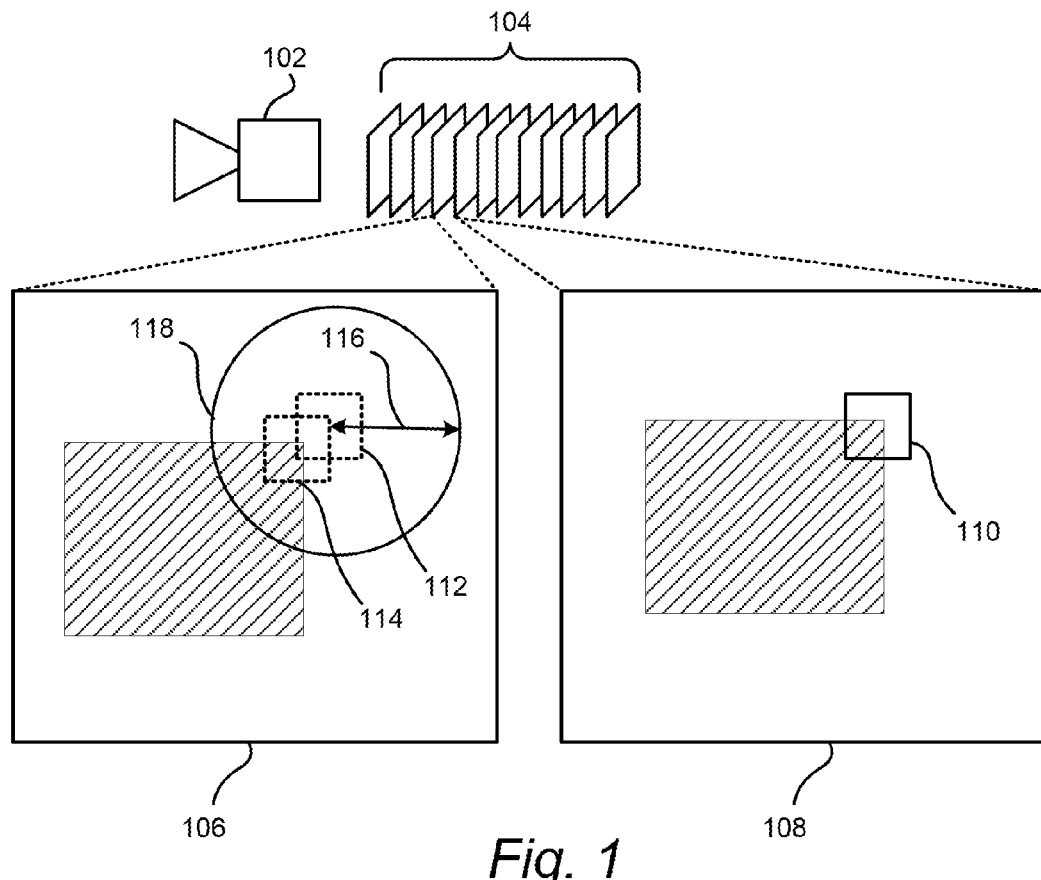
FIG. 1 schematically shows the basis of motion-compensated prediction encoding and the purpose of a motion vector search range of an encoder.

FIG. 1 shows a camera 102 that is capturing a video stream 104 which comprises a plurality of image frames 106, 108. When encoding such video stream, motion-compensated prediction encoding may advantageously be used as an encoding method. When the camera moves in 3D space, or when the content within the scene captured by the camera moves, this results in a displacement in the image plane of the content in the image frames. This is exemplified in FIG. 1 where the object in a first image frame 106 of the video stream has moved in a second image 108 of the video stream. Motion-compensated prediction encoding typically tries to represent a block of pixels, such as the block 110 in the second image frame 108, with a motion vector describing the movement for that block of pixels between the second image frame and a previous image frame 106. Optionally residual data corresponding to a difference of content between the encoded block of pixels 110 and the best matching block of pixels 114 in the previous image frame is also encoded.

The motion-compensated prediction encoding employs a motion vector search range 116 when searching for matching blocks of pixels in e.g. the previous image frame to the one being encoded. The encoding typically starts searching for a similar block of pixels at the same position 112 in the previous image 106 as the block 110 currently being encoded. Any suitable block matching algorithm may be used in the search. Originating from the start position 112, the encoder will search within the motion vector search range 116, for a matching block of pixels. In case no suitable matching block is found in the motion vector search area 118, the encoder will typically encode the block of pixels using I-block encoding, which requires more bits compared to if e.g. p-block encoding (motion-compensated prediction encoding) can be used. Needless to say, if the camera has moved such that corresponding blocks between two image frames are outside the motion vector search area 118, no matching blocks will be found and the entire image frame may need to be encoded using I-frame encoding, which result in an increased bit rate for transmitting the encoded image frame compared to if p-block encoding can be used for most or all blocks of pixels in the image frame. Such a scenario may be during a pan-tilt (PT) motion of the camera, where the bit rate can reach high levels. In a best case scenario, the PT-motion (adjustment of the FOV) will be small enough for the encoder to be able to find a good motion vector match and encode each macroblock as a P-block. However in many cases (especially if the encoder has a limited motion vector search range 116) the motion is too large and most blocks are instead encoded as I-blocks. As described above, I-blocks are generally much costlier to encode than P-blocks, which will result in that the bit rate spikes.

Figure 2:
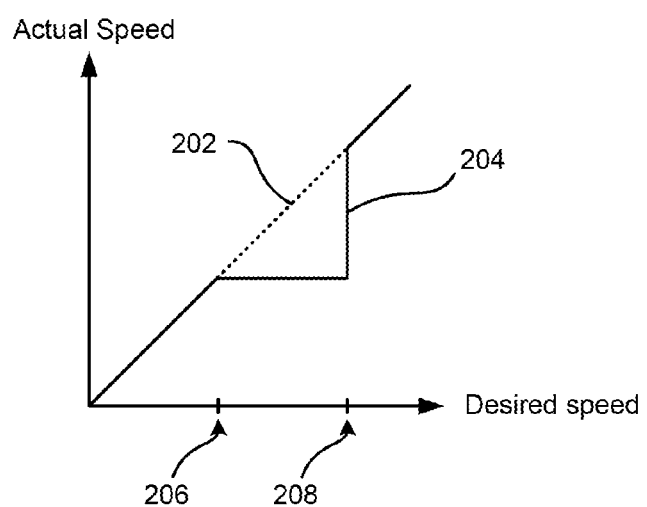
FIG. 2 shows a transfer function between a speed of a desired adjustment of a FOV of a camera and the actual speed of the adjustment of the FOV of the camera, FIGS. 3-6 each shows by way of example how an adjustment of a FOV can be translated into a speed and a direction of the adjustment.

The present invention is based on the idea to limit the allowed speed of an adjustment of the FOV (by a PT(Z) movement of the camera) based on the motion vector search range of the encoder, such that prediction encoding can be used in some cases where I-block encoding would otherwise be needed. A typical implementation may be to clamp the speed of the adjustment of the FOV as shown in FIG. 2, such that if the speed of the desired adjustment of the FOV is higher than what the encoder may be able to encode using P-blocks, but lower than a certain threshold speed, the speed of the adjustment can be restricted to meet the encoder requirements for p-block encoding. In FIG. 2, the speed 202 of a desired adjustment of the FOV and the speed of the actual speed 204 of the adjustment is the same except for a certain range of speed (between a first threshold speed 206 and a second threshold speed 208), where the actual speed 204 is clamped.

In other words, in case the speed of the desired adjustment of the FOV is between the first threshold speed 206 and second threshold speed 208, the FOV will be adjusted based on the direction of the desired adjustment of the FOV and the first threshold speed. By doing this, the speed of the adjustment of the FOV will be restricted to the encoder limit for a certain range of speeds while for speeds above the threshold, the actual speed will correspond to the desired speed. This is advantageous since for a user that wants to quickly adjust the FOV, the desired adjustment of the FOV will also be the resulting actual adjustment of the FOV.

Figure 3:
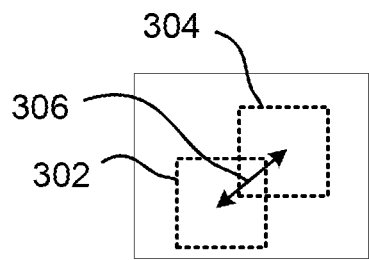

In order to calculate a speed and a direction of the desired adjustment of the FOV, different algorithms and scales may be used. For example, the speed of the desired adjustment may be expressed by a length of a vector in 3D space, e.g. from a center of the first FOV to a center of a second FOV. This embodiment is schematically shown in FIG. 3. To simplify the illustration, FIG. 3 (and also FIGS. 4-6) shows adjustments of the FOV in 2D space, i.e. 2D projection of the FOV in 3D space.

Alternatively, polar coordinates may be used to calculate a length and direction of the vector around an imaginary sphere with a center in an origin of the movement for the camera, i.e. a suspension point for the camera around which the camera can move.

The FOV may be represented by an angular extent of a given scene that is captured by the camera (described further below) and a point in 3D space representing the pointing direction of the camera. The center point of the FOV may thus be represented by the pointing direction (an X, Y, and Z value or similar) and the corners of the FOV may be calculated using the center point and the angular extent of a given scene that is captured by the camera.

By calculating a vector 306 between a first FOV 302 and a second, desired, FOV 304, the length of the vector 306 may be used as a value indicating the speed of the adjustment, while the direction of the vector may be used to indicate the direction of the adjustment of the FOV. The length may e.g. be calculated as a difference in X, Y and Z between the pointing direction of the camera having the first FOV 302 and the pointing direction of the camera having the second, desired, FOV 304.

Figure 4:
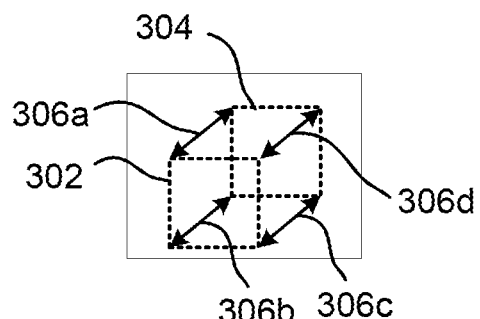

Instead of just using a center point of the first and second FOV for calculating the speed and direction, the corners of the FOV may be used. This is shown in FIG. 4 where 4 vectors 306*a-d* are calculated, one per each corner of the FOV. For calculating the speed and direction, an average value of the four vectors 306*a-d* may be used. Alternatively, the longest or the shortest vector may be used.

Figure 5:
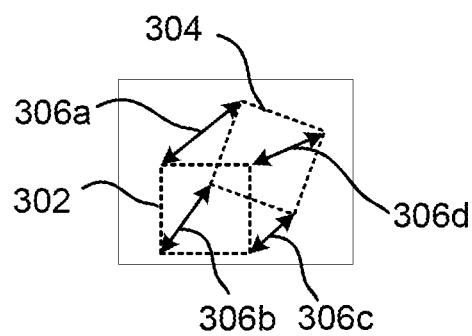
Figure 6:
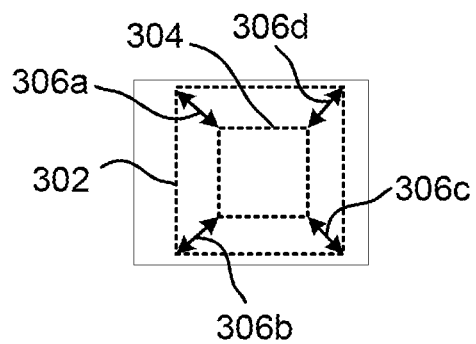

In case a zoom is involved, or if rotation of the FOV is involved in the adjustment, using the corners of the FOV for calculating the speed and direction of the adjustment of the FOV may be advantageous. In the case of rotation, as shown in FIG. 5, this may result in different length and direction of the four vectors 306*a-d*. The resulting speed and direction of the desired adjustment of the FOV may be calculated as described above. In case of zooming (as shown in FIG. 6), using the center of the first FOV 302 and the second FOV 304 would result in a zero vector, i.e. a vector of length 0, which thus has all components equal to zero. However, this is not correct since the content of the scene captured by the camera will have moved between the image frame captured by the camera with the first FOV 302 and the image frame captured by the camera with the second FOV 304.

It should be noted that the desired adjustment of the FOV is not instantaneous, but will instead take place during a period of time. For example, the first FOV 302 may be the FOV for a first image frame, while the second FOV may be the FOV for a n:th image frame. By using the frames per second (FPS) of the camera, the period of time for the adjustment can be calculated. For example, if the FPS is x frames per second; the period of time in this case will be n/x seconds. By calculating the speed based on the period of time, the case where the FPS of the camera differs from the encoding FPS of the encoder may be advantageously handled as described above.

When determining the first threshold speed (206 in FIG. 2), the motion vector search range of the encoder needs to be translated to a maximum adjustment of the FOV of the camera during the period of time. By taking into consideration the resolution of the images captured by the camera, and the angular extent of a given scene that is captured by the camera, the motion vector search range of the encoder can be translated into a maximum adjustment of the FOV of the camera. The lens or lenses of the camera is adapted to capture a cone of light. The image circle is the cross section of the cone of light. To avoid vignetting (saturation at the periphery of an image), the camera must have an image circle larger than the size of the image format of the captured image. The angular extent of a given scene that is captured by the camera corresponds to the captured image, not to the angle range that a lens can image.

For example, if the angular extent of the scene captured by the camera may be 40 degrees in a horizontal direction and 30 degrees in a vertical direction. The resolution of a captured image may be 1200*900 pixels. This means that every pixel corresponds to a 1/30 degree. In case the motion vector search range is 30 pixels, this corresponds to an adjustment of the FOV between two encoded images in the encoder of 1 degree. In case the FPS of the encoder is the same as the FPS of the camera, the maximum adjustment of the FOV between two captured images is 1 degree. For this example, the first threshold would thus correspond to a one degree adjustment of the FOV of the camera (in 3D space).

The second threshold speed (208 in FIG. 2) is determined by multiplying the first threshold speed with a value higher than 1. The value may be 1.2, 1.5, 2, 4 etc. According to some embodiments, the value is 2. So using the above example, the second threshold may correspond to 2 degrees adjustment of the FOV of the camera between two captured images.

So if the user desires to adjust the FOV with 38 degrees in a horizontal direction over the next 20 frames, the capping of the speed of the adjustment may be employed such that it will take 38 frames to adjust the FOV, resulting in a lower bit rate of the encoded video stream. If the user instead desires to adjust the FOV with 45 degrees, the capping will not be employed and the adjustment will take the desired 20 frames, which may result in a peak in the bit rate during the adjustment of the FOV since I-encoding may be needed. Using a second threshold as described above, users intending to quickly adjust the FOV of the camera may still be able to do this during the desired period of time for adjustments with a speed exceeding the second threshold.

Figure 7:
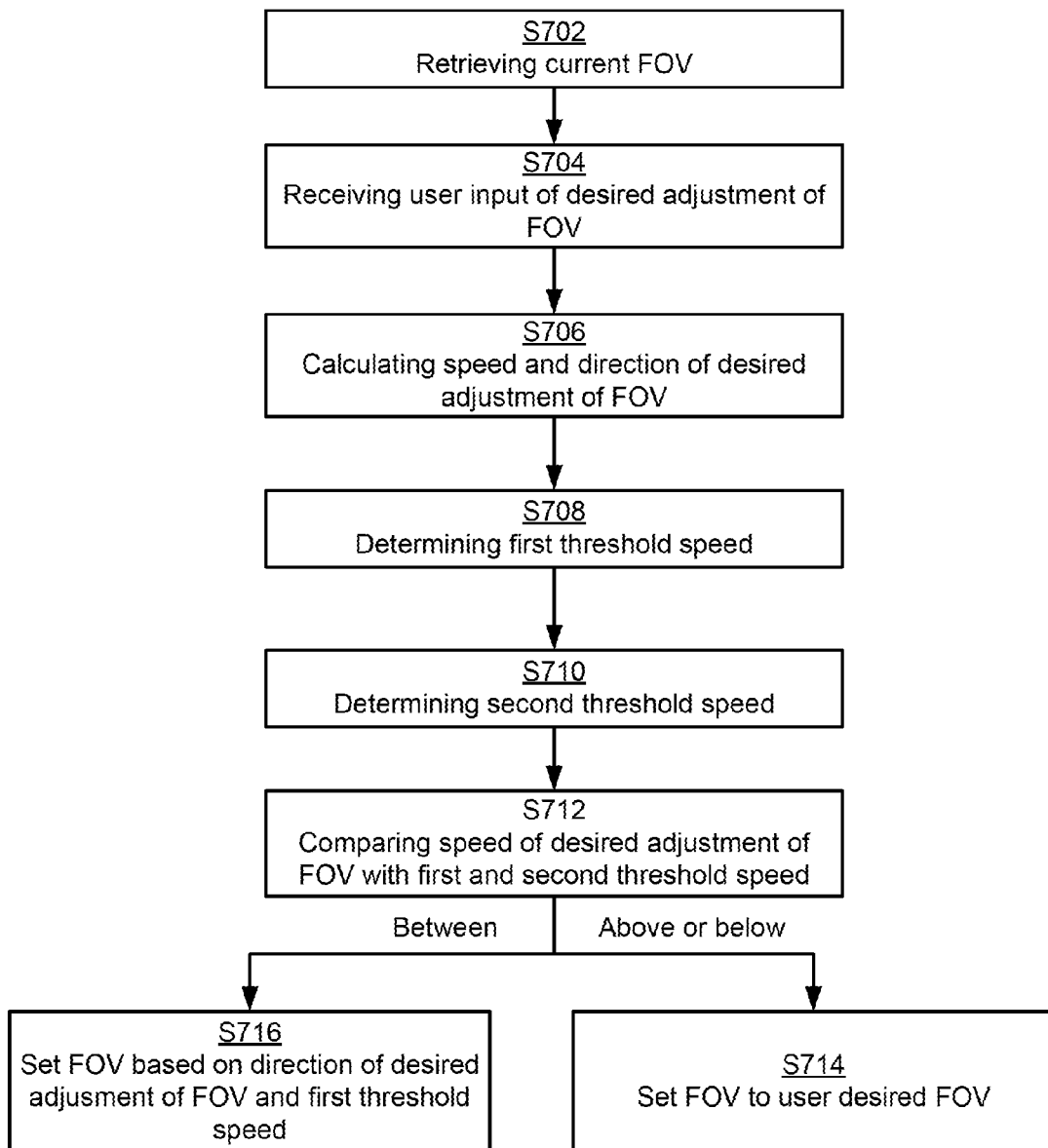
FIG. 7 shows a method for controlling a camera capable of PT control according to embodiments of the invention.

FIG. 7 shows a method for controlling a camera capable of PT control according to embodiments of the invention. As described above, also a camera capable of PTZ, PTR or PTZR control can be controlled using this method. The movements of the camera may be arranged to be remotely controlled.

The camera is connected to an encoder arranged to encode a video stream captured by the camera. The encoder may be external or internal to the camera. The encoder has a defined motion vector search range, which may or may not be adjustable.

The method comprises the step of retrieving S702 a first FOV setting of a current image frame in the video stream. This means that the current FOV of the camera is retrieved.

The method further comprises the step of receiving S704 a user input pertaining to a desired adjustment of the FOV from the first FOV setting to a second FOV setting in a subsequent image frame in the video stream. The user may for example input a command to the camera requesting the camera to turn 90 degrees in a horizontal direction, or change the zoom value from 1× to 2.5×. The desired adjustment may pertain to any adjustment of the FOV.

The user input may be provided to the camera by a joystick or other suitable controlling means for controlling the FOV of the camera such as a computer mouse. The joystick (mouse etc.) may comprise e.g. a button or similar which can be pushed (activated etc.) for overriding the capping of speed of the adjustment between the first and second threshold. The override functionality may also be provided in a computer interface available to the user. The controlling means can be used for directly adjusting the FOV by movement of the controlling means (e.g. the stick of the joystick), or the controlling means may be used in conjunction with a computer interface to point and click in an image for adjusting the FOV of the camera. In the latter case, such adjustment may be predefined to take place during a specific period of time, which period of time then can change based on the first and second threshold as described above and further below. Another typical situation is when the camera is set up to perform a guard tour, moving between a plurality of predefined positions, at a predefined speed.

The desired adjustment may thus involve a time period during which the adjustment takes place, or a number of image frames in the video stream that may be captured during the adjustment. In other words, the user input pertains to a desired adjustment of the FOV from the first FOV setting to a second FOV setting in a subsequent image frame in the video stream. From this, a period of time between the current image frame and the subsequent image frame may be defined, using a FPS setting of the camera.

From the desired adjustment of the FOV, a speed and a direction of the desired adjustment of the FOV may be calculated S706. The calculation of the speed involves the period of time during which the adjustment takes place.

The method further comprises the step of determining S708 a first threshold speed by translating the motion vector search range of the encoder to a maximum adjustment of the FOV of the camera during the period of time. From this, a speed of the maximum adjustment of the FOV can be calculated. It should be noted that in case the motion vector search range of the encoder is a fixed number (e.g. 15, 30 40, 50 etc.) number of pixels, the step of determining S708 a first threshold speed may be needed to be performed only once for each camera, or only on startup of the camera.

The method further comprises the step of determining S710 a second threshold speed by multiplying the first threshold speed with a value higher than 1. As understood from the above, according to some embodiments, this step is only performed when the first threshold speed is determined S708. The value can be any suitable value higher than 1, e.g. 1.2, 1.5, 2, 2.5, 4 etc.

The method further comprises the step of comparing S712 the speed of the desired adjustment of the FOV with the first threshold speed and the second threshold speed, and based on this comparison the FOV may be adjusted in two different ways.

If it is determined that the speed of the desired adjustment of the FOV is higher than the second threshold speed or lower than the first threshold speed, the FOV of the camera is adjusted S714 from the first FOV setting to the second FOV setting during the period of time. This means that the desired adjustment of the FOV from the user is performed.

However, if it is determined that the speed of the desired adjustment of the FOV is between the first threshold speed and second threshold speed, the FOV of the camera is adjusted S716, during the period of time, based on the direction of the desired adjustment of the FOV and the first threshold speed. This means that the FOV is adjusted with the maximum speed such that the encoder still may find corresponding blocks of pixels between two image frames in the video stream, and the bit rate may thus be kept at a lower level compared to if the FOV was allowed to be adjusted according to the desire of the user.

What is claimed is:

1. A method for controlling a camera capable of pan and tilt (PT) control, the camera being connected to an encoder arranged to encode a video stream captured by the camera, the encoder having a motion vector search range, the method comprising the steps of:
   retrieving a first field of view (FOV) setting of a current image frame in the video stream,
   receiving an input pertaining to a desired adjustment of the FOV from the first FOV setting to a second FOV setting in a subsequent image frame in the video stream, defining a period of time between the current image frame and the subsequent image frame using a frame per second (FPS) setting of the camera, and calculating a speed and a direction of the desired adjustment of the FOV using the period of time,
   determining a first threshold speed by translating the motion vector search range of the encoder to a maximum adjustment of the FOV of the camera during the period of time and calculating a speed of the maximum adjustment of the FOV,
   determining a second threshold speed by multiplying the first threshold speed with a value higher than 1,
   comparing the speed of the desired adjustment of the FOV with the first threshold speed and the second threshold speed,
   upon determining that the speed of the desired adjustment of the FOV is higher than the second threshold speed or lower than the first threshold speed, adjusting the FOV of the camera from the first FOV setting to the second FOV setting during the period of time,
   upon determining that the speed of the desired adjustment of the FOV is between the first threshold speed and second threshold speed, adjusting the FOV of the camera during the period of time based on the direction of the desired adjustment of the FOV and the first threshold speed.

2. The method according to claim 1, wherein the camera is further capable of zoom (Z) control.

3. The method according to claim 1, wherein the camera is further capable of rotation (R) control.

4. The method according to claim 1, wherein the encoder is arranged to encode the video stream with a FPS setting different than the FPS setting of the camera, wherein the step of determining a first threshold speed comprises:
   calculating a ratio between the FPS setting of the encoder and the FPS setting of the camera.

5. A method according to claim 1, wherein the second threshold speed is determined by multiplying the first threshold speed with 2.

6. A non-transitory computer-readable storage medium with computer code instructions adapted to carry out the method of claim 1 when executed by a device having processing capability.

7. A controlling device adapted for controlling a camera capable of pan and tilt (PT) control, the camera being connected to an encoder arranged to encode a video stream captured by the camera, the encoder having a motion vector search range, the controlling device comprising a processor arranged for:
   retrieving, from the camera, a first field of view (FOV) setting of a current image frame in the video stream,
   receiving a user input pertaining to a desired adjustment of the FOV from the first FOV setting to a second FOV setting in a subsequent image frame in the video stream, defining a period of time between the current image frame and the subsequent image frame using a frame per second (FPS) setting of the camera, and calculating a speed and a direction of the desired adjustment of the FOV using the period of time,
   determining a first threshold speed by translating the motion vector search range of the encoder to a maximum adjustment of the FOV of the camera during the period of time and calculating a speed of the maximum adjustment of the FOV,
   determining a second threshold speed by multiplying the first threshold speed with a value higher than 1,
   comparing the speed of the desired adjustment of the FOV with the first threshold speed and the second threshold speed,
   upon determining that the speed of the desired adjustment of the FOV is higher than the second threshold speed or lower than the first threshold speed, adjusting the FOV of the camera from the first FOV setting to the second FOV setting during the period of time,
   upon determining that the speed of the desired adjustment of the FOV is between the first threshold speed and second threshold speed, adjusting the FOV of the camera during the period of time based on the direction of the desired adjustment of the FOV and the first threshold speed.

8. A camera capable of pan and tilt, PT, control, the camera being connected to an encoder arranged to encode a video stream captured by the camera, the camera comprising a controlling device according to claim 7.

9. A camera according to claim 8 being connected to a joystick for providing the input pertaining to the desired adjustment of the FOV.

\* \* \* \* \*